United States Patent Office 2,906,872
Patented Sept. 29, 1959

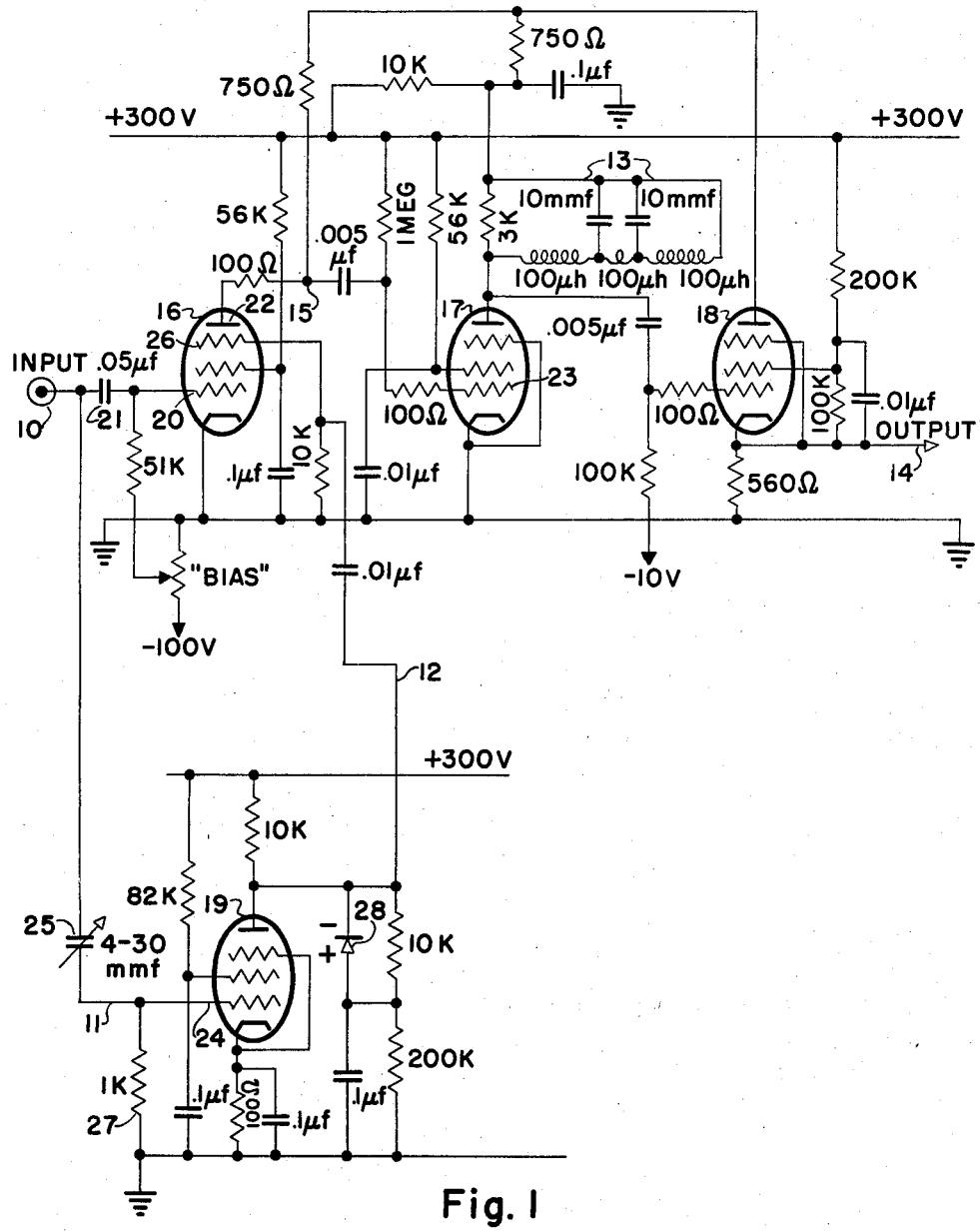
Fig. I
INVENTOR.
CHARLES WILKIN JOHNSTONE

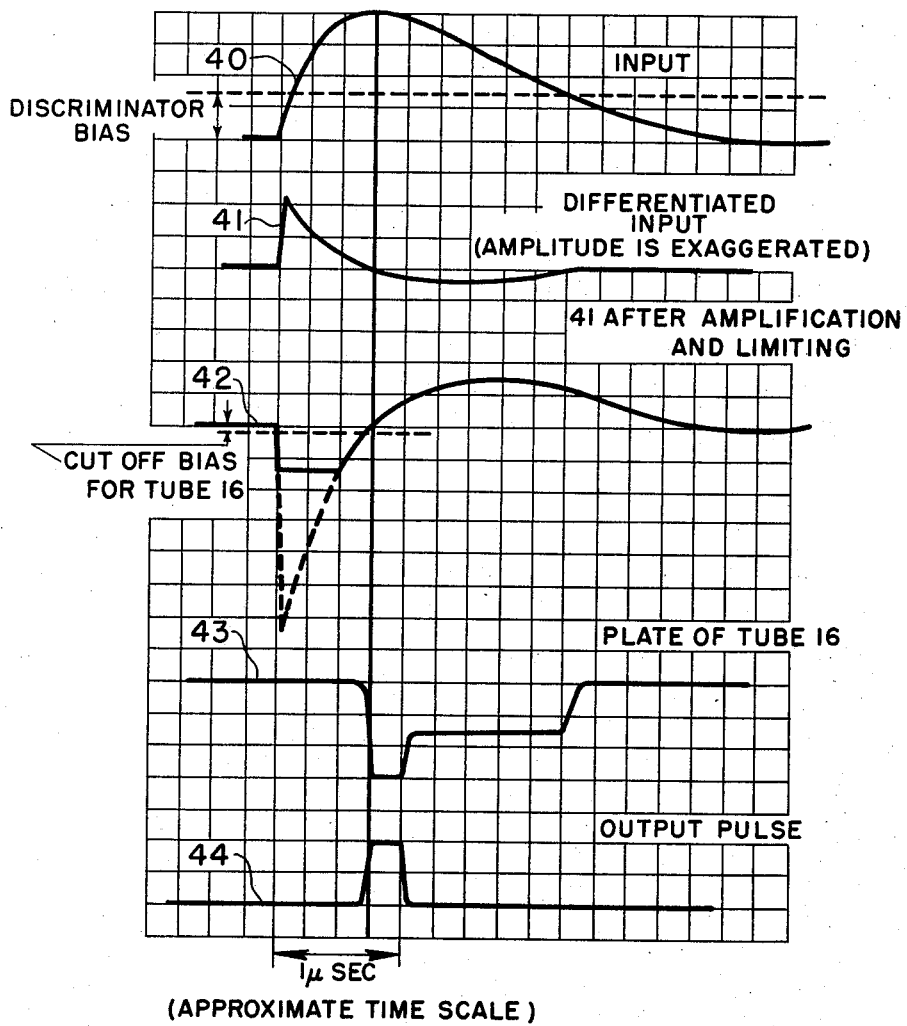

2,906,872
RISE TIME DELAY DISCRIMINATOR

Charles W. Johnstone, Los Alamos, N. Mex., assignor to the United States of America as represented by the United States Atomic Energy Commission Application May 5, 1955, Serial No. 506,393

1 Claim. (Cl. 250—27)

This invention relates to pulse discriminator devices and more particularly to a discriminator which accepts pulses only when the pulses are at maximum amplitude.

In the field of experimental nuclear physics, considerable use is made of coincidence circuits to study events which occur simultaneously. Pulse coincidence measurements are generally made in the presence of a number of unrelated or non-coincident pulses. In order to minimize the number of accidental coincidences, it is desirable to use pulses of as short duration as possible, and in order to maximize the detection of actual coincidences, it is necessary to know with accuracy the time of arrival of each pulse.

Pulses which originate in particle or gamma ray detectors are of various amplitudes, and constitute an amplitude spectrum. The amplitude type discriminators of the prior art accept all pulses above a certain size and for each pulse accepted generate a new pulse of predetermined uniform height and width. The uniform output pulses from two or more discriminators may be compared by a coincidence circuit and if so, it is important that the discriminator output pulses be precisely related to the exact time of arrival of the incoming pulse. Since coincident pulses of different amplitudes will reach a given threshold voltage at different times, it is necessary to choose a different criteria to determine the time of arrival of a pulse. As the maximum amplitude of coincident pulses of like shape but different amplitude will occur at the same time, it is possible to have the discriminator accept pulses on the basis of maximum amplitude.

The circuit of the present invention incorporates a novel feature, which may be described as "rise time delay," and which greatly reduces the time uncertainty of a discriminator triggered by pulses of various amplitudes. When pulses of various amplitudes are applied to conventional discriminators of the prior art, the time between the start of each input pulse and the time the discriminator becomes conducting will be a function of the amplitude of the input pulse. With a wide range of input pulse amplitudes a time-uncertainty exists which is approximately equal to the over-all rise time of the input pulses.

The present invention controls the time at which the discriminator accepts pulses, such acceptance occurring at a time which corresponds closely to the maximum of the input pulse.

It is, therefore, an object of this invention to provide a discriminator circuit which accepts input pulses only when the pulses have reached their maximum amplitude.

Further objects of this invention will be apparent from the following specifications and claims which include a preferred embodiment of the invention, and from the drawings hereby made a part of the specification, wherein:

Figure 1 is a circuit drawing of the preferred embodiment,

Figure 2 is a group of curves to show why a fixed discriminator bias does not determine pulse arrival time for coincident pulses of different amplitude, and Figure 3 is a series of curves to show the wave forms which appear at various locations in the discriminator circuit.

In Figure 1, tube 16 has its control grid 20 connected to the source of pulses 10 thru a capacity 21, and its plate 22 resistor-capacity connected to the control grid 23 of tube 17. Tube 19 has its control grid 24 connected to the source of pulses thru differentiating condenser 25. The output or plate of tube 19 is capacity coupled to the suppressor grid 26 of tube 16. Tubes 17 and 18 comprise a trigger circuit which shapes the pulses accepted by tube 16 in a conventional manner well-known to those skilled in the art. Suggested tube types are: tube 16, a 6BN6, and tubes 17, 18 and 19, 6AH6's. Other tube types having characteristics similar to these can be used.

In operation, the input signal 10 is simultaneously applied to coupling condenser 21 and differentiating condenser 25. Differentiating condenser 25 with its associated resistor 27 comprise a time constant much shorter than the rise time of the input pulses. The differentiated signal appearing at 11 is amplified by tube 19 and the negative portion of the amplified derivative pulse appearing at 12 is limited in size by a biased diode 28. This amplified and inverted derivative pulse on conductor 12 is applied to the suppressor grid 26 of tube 16. The derivative inverted pulse on conductor 12 immediately acts to block the firing action of the first discriminator tube 16 before the input pulse overcomes the bias on the control grid 20 of tube 16. Blocking persists until the maximum of the input pulse is reached. At this time the differentiated signal appearing at 11 is at zero voltage and the amplified derivative appearing at 12 is also at zero voltage. The amplified derivative 12 no longer holds the suppressor grid 26 of tube 16 below cut-off, so tube 16 conducts and the discriminator circuit issues an output pulse. An adjustment of the differentiator time constant can be found which will give a consistent firing time over a wide range of input pulse amplitudes. If the input pulse rise time is considerably faster or slower than 1 $\mu$sec., better results may be obtained by choosing a different value resistor in the differentiator.

It should be noted that input tube 16 is a 6BN6 or similar tube. The 6BN6 is not a conventional pentode, but a gated beam discriminator tube. Its characteristics are unique, as the control grid of this tube may be driven 100 volts or more positive with only about 1 ma. of grid current, and the suppressor grid 26 of this tube can cut off the plate current with a small negative bias of 2 or 3 volts.

Figure 2 shows two pulses, 30 and 32, coincident but of different amplitude, and one pulse 33 not coincident with 30 or 32. Note that coincident pulses 30 and 32 would cross a given discriminator bias level at different times, but that both reach maximum amplitude at the same time. If these pulses were received from different sources by a pair of ordinary discriminators it will not appear that pulses 30 and 32 are coincident because of the time difference in reaching the bias level, but pulse 33 would appear to be coincident with pulse 32 tho it really is not. The maximum amplitudes of pulses 30 and 32 are, however, coincident in time, and the use of a pair of rise time delay discriminators of the present invention will determine that these two pulses are coincident and that pulse 33 is not, since the differential pulses of 30 and 32 will be zero at the same time and the differential pulse of 33 will be zero at a later time.

With reference to Figure 3, wave forms are shown which follow a given pulse thru the discriminator circuit. Curve 40 shows a typical pulse arriving at the discriminator input 10 of Figure 1. The differentiated input to tube 19 is shown as curve 41. Notice that the curve has zero magnitude when the incoming pulse 40 is at maximum amplitude. Curve 42 shows the wave form applied as bias to the suppressor grid 26 of tube 16. Notice that the bias becomes zero at the time of maximum amplitude of the incoming pulse.

The limiting diode 28 of Figure 1 does not allow the pulse to drop as the dotted line indicates it would without the diode. Curve 43 shows the wave form at the plate of tube 16 which results when the discriminator fires. The leading edges of pulse 43 and output pulse 44 both correspond closely to the time of maximum amplitude of curve 40. The duration of output pulse 44 is determined by the shorted delay line network 13 located in the plate circuit of tube 17. A coincident pulse of the same rise time but different magnitude entering another similar discriminator would cause an output pulse from that discriminator to be coincident with pulse 44.

It is understood that the present invention herein described is of a preferred embodiment. Circuit elements or vacuum tubes could be changed to alter the exact mode of operation, but without altering the principle of the rise time delay discriminator. The exact value of the circuit elements are shown in Figure 1, the preferred embodiment, but other values could be used in other embodiments. For example, as described previously, the time constant of the differentiator might be changed to better suit the random pulse amplitudes of a particular experiment, but the principle of operation of the circuit would remain the same.

Therefore, it is understood that the present invention is not limited by the foregoing description but solely by the appended claim.

What is claimed is:

An electronic pulse height discriminator and coincidence circuit for generating output pulses in response to positive polarity peaked input signal pulses of various amplitudes greater than a selected threshold at the instant the input pulses reach their peak value comprising a source of positive polarity peaked input pulses of various amplitudes, a first thermionic tube having at least two control grids and a differentiating circuit and a second thermionic tube; substantially zero time delay means directly coupling a first control grid of said first thermionic tube to said source of input pulses, and a resistor directly connecting the second control grid of the first thermionic tube to the cathode thereof, said second thermionic tube having at least one control electrode, said differentiating circuit having a time constant much shorter than the rise time of the input pulses directly coupling the second thermionic tube control electrode to said source of input pulses, a zero time constant resistive impedance serially connecting the anode of the second thermionic tube to a source of anode potential, a capacitor directly couping the anode of the second thermionic tube to the second control grid of the first thermionic tube, resistor means and selected negative bias means serially connecting the said first grid to the cathode of the first thermionic tube to pre-select the threshold conductivity thereof, whereby the negative output of said second tube generated during the rise time of an input signal pulse blocks any response of said first thermionic tube to said input signal pulse until the peak of the pulse is reached substantially, at which time the differential of the time rate of change of the said input pulse is zero substantially, thereby permitting said first thermionic tube to generate an output pulse at the instant, substantially, of the said input pulse maximum value.

References Cited in the file of this patent
UNITED STATES PATENTS

| | | |
|---|---|---|
| 2,252,599 | Lewis | Aug. 12, 1941 |
| 2,293,528 | Barco et al. | Aug. 18, 1942 |
| 2,448,718 | Koulicovitch | Sept. 7, 1948 |
| 2,484,352 | Miller et al. | Oct. 11, 1949 |
| 2,568,750 | Krause et al. | Sept. 25, 1951 |
| 2,576,552 | Wittenberg | Nov. 27, 1951 |
| 2,616,967 | Beukema | Nov. 4, 1952 |